(12) United States Patent
Brown et al.

(10) Patent No.: US 7,708,028 B2
(45) Date of Patent: May 4, 2010

(54) FAIL-SAFE VACUUM ACTUATED VALVE FOR HIGH PRESSURE DELIVERY SYSTEMS

(75) Inventors: Lloyd Anthony Brown, E. Amherst, NY (US); Scott Lawrence Cooper, Buffalo, NY (US); Douglas Charles Heiderman, Akron, NY (US); Brian Michael Meredith, N. Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 11/635,875

(22) Filed: Dec. 8, 2006

(65) Prior Publication Data

US 2008/0135104 A1 Jun. 12, 2008

(51) Int. Cl.
*F16K 31/365* (2006.01)
(52) U.S. Cl. .................... 137/613; 137/494; 251/335.3; 251/368; 251/118
(58) Field of Classification Search ............... 137/613, 137/494, 495, 906; 251/335.3, 118, 123, 251/368
See application file for complete search history.

(56) References Cited

U.S. PATENT DOCUMENTS

| 3,245,583 | A | | 4/1966 | Miller et al. |
| 3,709,242 | A | | 1/1973 | Chase |
| 4,134,449 | A | * | 1/1979 | La Haye et al. ................ 165/83 |
| 4,143,672 | A | * | 3/1979 | West .......................... 137/81.2 |
| 4,222,713 | A | * | 9/1980 | DeKeyser et al. ........... 417/214 |
| 4,793,379 | A | | 12/1988 | Eidsmore |
| 5,303,734 | A | | 4/1994 | Eidsmore |
| 5,409,526 | A | | 4/1995 | Zheng et al. |
| 5,906,896 | A | * | 5/1999 | Jackson et al. .............. 428/621 |
| 5,937,895 | A | | 8/1999 | Le Febre et al. ............ 137/494 |
| 6,007,609 | A | | 12/1999 | Semerdjian et al. ........... 96/108 |
| 6,045,115 | A | | 4/2000 | Martin, Jr. et al. .......... 251/118 |
| 6,089,027 | A | | 7/2000 | Wang et al. .................. 62/46.1 |
| 6,101,816 | A | | 8/2000 | Wang et al. .................. 62/48.1 |
| 6,155,540 | A | * | 12/2000 | Takamatsu et al. ......... 261/78.2 |
| 6,202,281 | B1 | * | 3/2001 | Semenov et al. .............. 29/454 |
| 6,857,447 | B2 | | 2/2005 | Olander et al. .............. 137/240 |
| 6,959,724 | B2 | | 11/2005 | Heiderman ................. 137/494 |
| 2004/0000338 | A1 | | 1/2004 | Heiderman |
| 2004/0159005 | A1 | | 8/2004 | Olander |

FOREIGN PATENT DOCUMENTS

| EP | 1 575 424 | | 7/1969 |
| EP | 1 316 755 A1 | | 6/2003 |
| WO | WO 02/12779 A1 | | 2/2002 |

\* cited by examiner

*Primary Examiner*—Kevin L Lee
(74) *Attorney, Agent, or Firm*—Iurie A. Schwartz

(57) ABSTRACT

A high pressure storage and delivery system having a fail-safe vacuum actuated valve is provided. In particular, through the innovative design of the vacuum actuated check valve, the system can accommodate up to three times the volume of product in similar size cylinders.

19 Claims, 5 Drawing Sheets

FAIL-SAFE VACUUM ACTUATED VALVE FOR HIGH PRESSURE DELIVERY SYSTEMS

BACKGROUND OF THE INVENTION

1. Field of the Invention

The present invention relates to a high pressure storage and delivery system having a fail-safe vacuum actuated valve to prevent the hazardous discharge of fluid from a vessel such as a pressurized cylinder or tank. More specifically, the invention relates to a fail-safe valve designed to accommodate a high volume of product in the delivery system and the dispensation of product upon the application of a predetermined vacuum condition on the downstream side of the valve.

2. Description of Related Art

Industrial processing and manufacturing applications require the use of highly toxic fluids. The manufacture of semiconductor materials represents one such application wherein the safe storage and handling of highly toxic hydridic or halidic gases becomes necessary. Examples of such gases include silane, germane, ammonia, phosphine, arsine, stibine, hydrogen sulfide, hydrogen selenide, hydrogen telluride, phosphorous trifluoride, arsenic pentafluoride and other halide compounds. As a result of toxicity and safety considerations, these gases must be carefully stored and handled in the industrial process facility. The semiconductor industry in particular relies on the gaseous hydrides of arsine ($AsH_3$) and phosphine ($PH_3$), boron trifluoride ($BF_3$), silicon tetrafluoride as sources of arsenic (As), phosphorus (P), boron (B), and (Si) in ion implantation. Ion implantation systems typically use dilute mixtures of $AsH_3$ and $PH_3$ stored at pressures as high as 800 psig and pure gases such as $BF_3$ and $SiF_4$ stored at pressures as high as 1500 psig within the delivery vessel. Due to their extreme toxicity and high vapor pressure, their use, transportation and storage raise significant safety concerns for the semiconductor industry.

To address the various safety concerns, there have been a number of systems developed to deliver these hydridic and halidic compounds to the ion implant tool at sub-atmospheric conditions. For example, a chemical system, known as SDS™ and commercialized by ATMI, Inc. involves filling a compressed gas cylinder with a physical adsorbent material (beaded activated carbon), and reversibly adsorbing the dopant gases onto the material. The desorption process involves applying a vacuum or heat to the adsorbent material/cylinder. In practice, vacuum from the ion implanter is used to desorb the gas from the solid-phase adsorbent. There are certain limitations associated with the SDS technology, and they include: 1) the adsorbent material has a finite loading capacity thereby limiting the amount of product available in a given size cylinder; 2) the desorption process can be initiated by exposing the cylinder package to heat, thereby causing the cylinders to reach and deliver gases at atmospheric and super-atmospheric pressures when the cylinder is exposed to temperatures greater than 70° F., which are common in many cylinder warehouse locations and within the ion implant tool; 3) the purity of the gas delivered from the cylinder can be compromised due to adsorption/desorption of the other materials/gases on the adsorbent material; 4) cylinder percent utilization is highly influenced by the depth of vacuum applied to the package, i.e. cylinders are often returned with appreciable product left in the package; and 5) adsorbent attrition can lead to particulate contamination in the gas delivery system.

Separately, a number of mechanical systems have been developed for the sub-atmospheric delivery of dopant gases. Some involve the use of a pressure regulator, while others require valve devices to control and deliver the product sub-atmospherically. These devices are set to deliver or open when sub-atmospheric or vacuum conditions are applied to the delivery port of the cylinder. The exact location of these devices can be in the port body, in the neck cavity, inside the cylinder itself, or combinations of all three locations. In each case the pressure regulator or valve device is located upstream of the cylinder valve seat with respect to flow of gas from the interior of the cylinder to the delivery port.

U.S. Pat. Nos. 6,089,027 and 6,101,816 are both related to a fluid storage and dispensing system comprising a vessel for holding a desired pressure. The vessel contains a pressure regulator, e.g., a single-stage or multi-stage regulator, associated with a port of the vessel, and set at a predetermined pressure. A dispensing assembly, e.g., including a flow control means such as a valve, is arranged in gas/vapor flow communication with the regulator, whereby the opening of the valve effects dispensing of gas/vapor from the vessel. The fluid in the vessel may be constituted by a liquid that is confined in the vessel at a pressure in excess of its liquefaction pressure at prevailing temperature conditions, e.g., ambient (room) temperature.

U.S. Pat. No. 6,857,447 B2 discloses a gas dispensing assembly wherein the source vessel contains a gas at pressures ranging from 20 to 2,000 psig. The apparatus requires a high pressure gas cylinder with a larger than typical neck opening to accommodate the introduction of two pressure regulators in series along the fluid discharge path. The first regulator on the inlet gas side drops the pressure from 1,000 psig (or the actual pressure within the vessel at the time) to 100 psig, while the second regulator from 100 psig to sub-atmospheric pressure.

U.S. Pat. No. 5,937,895 is directed to fluid storage and dispensing vessel having a dispensing valve and a flow restriction arrangement to provide a virtually fail safe system for preventing hazardous discharge of fluid from a pressurized cylinder or tank. U.S. Pat. Nos. 6,007,609 and 6,045,115 disclose flow restrictors disposed along the fluid flow path and which provide capillary size openings that minimize any discharge of toxic gases from compressed gas cylinders in the unlikely event that the dispensing valve fails. The disclosure of these latter three documents provide for a sub-atmospheric delivery system, wherein the bellows chamber is located downstream of a valve seat with regard to the flow of gas through a valve.

The drawbacks associated with the related art storage and delivery systems is that they are unable to handle cylinder fill pressures greater than 600 psig or otherwise would require two devices in series. For example, while arsine and phosphine cylinder packages are filled as liquefied fluids, the internal pressure of these fluids is limited to their respective vapor pressures which at 70° F. typically range from about 205 to about 580 psig. However, fluids such as boron trifluoride, and silicon tetrafluoride fluids are filled as a gas phase product, and the cylinder fill pressure required is 600 psig or greater. Specifically, the related art systems cannot work at cylinder pressures greater than 600 psig due to insufficient thrust force from the bellows.

Another disadvantage in the present systems is that they cannot accommodate a higher capacity of fluid product and, therefore, require frequent replacement of the cylinder package. In turn this leads to frequent change out of the product cylinder and increased down time for the semiconductor manufacturer.

Further, the current systems which utilize a dispensing check valve, require that a conditioning treatment of the bellows must take place prior to assembly of the valve in order to remove residual stresses. In particular, the dispensing valve is cycled through an extensive elevated temperature and pressure regime with nitrogen gas. As a result, the stainless steel bellows are exposed to thermal and pressure extremes during the conditioning process.

To overcome the disadvantages of the related art it is an object of the present invention to provide a system for storage and delivery of fluids in gaseous and/or partial gaseous/liquefied phase, where the fluids are stored at pressures greater than 600 psig. In particular, the dispensing valve contains a charged bellows chamber, and the bellows are made of a material which provides the appropriate axial thrust force to overcome the pressures within the cylinder/tank.

It is another object of the present invention to increase the capacity of the cylinder/tank without changing the dimensions of the cylinder/tank or the cylinder valve head, including the port body. In this manner a higher volume of gas can be accommodated in the cylinder/tank. As a result, a reduction in customer's process variability and an increase in productivity is achieved. Moreover, an economic and safety benefit is attained by having fewer cylinder/tank change outs, thereby reducing the down-time of the semiconductor manufacturing tool.

It is a further object of the invention to eliminate the conditioning of the valve, which is a labor intensive process.

Other objects and aspects of the present invention will become apparent to one of ordinary skill in the art upon review of the specification, drawings and claims appended hereto.

SUMMARY OF THE INVENTION

According to an aspect of the invention, a system for controlling the discharge of pressurized fluids from the outlet of a pressurized tank containing hydridic or halidic compounds is provided. The apparatus includes a tank for holding a pressurized fluid in a gaseous or partial gaseous phase; a port body for communication with the outlet of a pressurized tank defining a fluid discharge path; a valve element fixed in or upstream of the port body and adapted to movement between a sealing position that blocks fluid flow through the fluid discharge path and an open position that permits fluid along the fluid path; a bellows chamber disposed within a housing downstream of the valve element, wherein the bellows chamber is charged and sealed to a pressure ranging from about 14.7 psia to about 50 psia, the bellows being made of a material selected from the group consisting of age hardened steel alloys, age hardened nickel based alloys and copper beryllium alloys; and where the bellows chamber communicates with a portion of the fluid discharge path downstream of the valve element to move the valve element to the open position when communication with the discharge path produces a vacuum condition within the housing.

According to another aspect of the invention, a cylinder and a valve assembly for containing pressurized fluid and controlling the discharge of pressurized fluids from the cylinder is provided. The cylinder and the valve assembly includes a cylinder having a cylinder opening; a cylinder valve having a port body adapted for sealing engagement with the cylinder opening; a fluid inlet port defined by the port body and located within the cylinder; a fluid outlet port defined by the port body and located outside the cylinder; a fluid discharge path defined by the port body between the fluid inlet port and the fluid outlet port; a manually or automatically operated shut-off valve for controlling fluid flow along the fluid discharge path; and a vacuum actuated check valve containing a valve element biased into a sealing position that blocks fluid flow along the fluid discharge path and a bellows chamber charged and sealed to a pressure ranging from about 14.7 psia to about 50 psia, located downstream of the valve element along the fluid discharge path, the bellows being made of a material selected from the group consisting of age hardened steel alloys, age hardened nickel based alloys and copper beryllium alloys; and wherein the bellows chamber has one portion fixed with respect to the body of the vacuum actuated check valve and another portion operably linked to the valve element when relative pressure between the interior and exterior of the bellows expands the bellows and biases the valve element in an open position so as to permit fluid flow along the fluid discharge path.

In accordance with yet another aspect of the present invention, a bellows assembly of a vacuum actuated check valve is provided. The check valve includes a bellows chamber disposed within the vacuum actuate check valve housing, wherein the bellows are charged and sealed to a pressure ranging from 14.7 psia to 50 psia, and wherein the bellows are made of a material selected from a group consisting of age hardened steel alloys, age hardened nickel based alloys and copper alloys. The bellows chamber is responsive to a vacuum condition on the exterior of the bellows within the chamber so as to expand the bellows with a thrust force of at least 4 lbf.

BRIEF DESCRIPTION OF THE FIGURES

The objects and advantages of the invention will be better understood from the following detailed description of the preferred embodiments thereof in connection with the accompanying figures wherein like numbers denote same features throughout and wherein.

DETAILED DESCRIPTION OF THE INVENTION

The present invention provides a low pressure or sub-atmospheric pressure storage and delivery system as a source gas supply for applications involving semiconductor processing, such as ion implantation. The system controls the discharge of pressurized fluids stored in gaseous or partially gaseous phase. For purposes of explanation, the invention is further described in the context of the delivery of boron trifluoride. However, it will be understood by those skilled in the art that any hydridic or halidic compound such as enriched boron trifluoride (i.e., $^{11}BF_3$), silane, fluorine or silicon tetrafluoride may be utilized.

Figure 1:
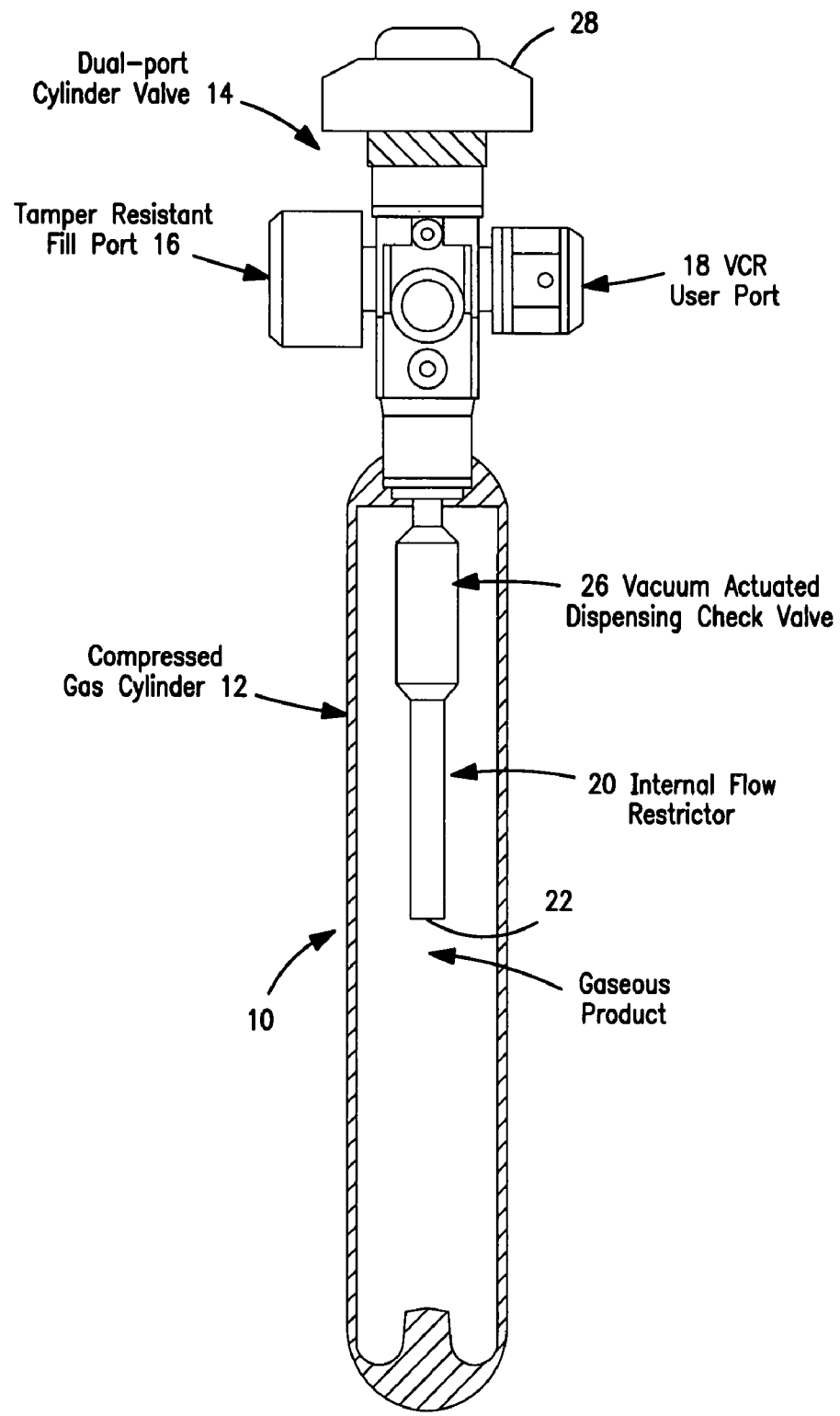
FIG. 1 illustrates a schematic cross-sectional view of a system for the storage and controlled dispensation of a pressurized fluid therefrom.

As illustrated in FIG. 1, a system 10 for the storage and delivery of pressurized and toxic fluid is depicted. System 10 includes high pressure cylinder or tank 12 containing boron trifluoride in gaseous or partially gaseous phase. The compressed gas cylinder can be a conventional 500 cc cylinder, such as the one approved by the Department of Transportation 3AA cylinder, but is not limited thereto. A cylinder valve head 14 is threadably engaged at the top end of cylinder 12. The cylinder valve head 14 can be dual-port 316 stainless steel valve, such as the one manufactured by Ceodeux, Inc. The dual-port valve cylinder head 14 has a tamper resistant fill port 16, through which cylinder 12 is filled with product. Upon filling, the user can draw product from the cylinder through user port 18, which is a face-seal VCR™ port having an outlet opening ranging from about 0.25 to about 0.5 inches. The interior of the cylinder contains an internal flow restrictor 20 having an inlet 22. Until exhausted, boron trifluoride flows into inlet 22, through the internal flow restrictor and a vacuum actuated check valve 26, along a fluid flow path, described in detail below, to user port 18.

Vacuum actuated check valve 26 contains a bellows chamber that automatically controls the discharge of boron trifluoride fluid from the cylinder. Naturally, check valve 26 can be disposed in the port body of the dual-port valve, upstream of the dual-port valve, within the cylinder or partly in the dual-port valve and partly within the cylinder along the fluid flow path. As shown in the exemplary embodiment of FIG. 1, the vacuum actuated check valve is fully disposed inside cylinder 12, by affixing one portion of the check valve to the housing which is located along the fluid discharge path. A handle 28 at the top of dual-port valve allows manual control of the fluid along the fluid discharge path leading to user port 18. This type of a fluid storage and dispensing system is described in aforementioned U.S. Pat. Nos. 5,937,895, 6,007,609 and 6,045,115, albeit referencing a single port valve cylinder head, and which are incorporated herein by reference in their entirety.

Figure 2:
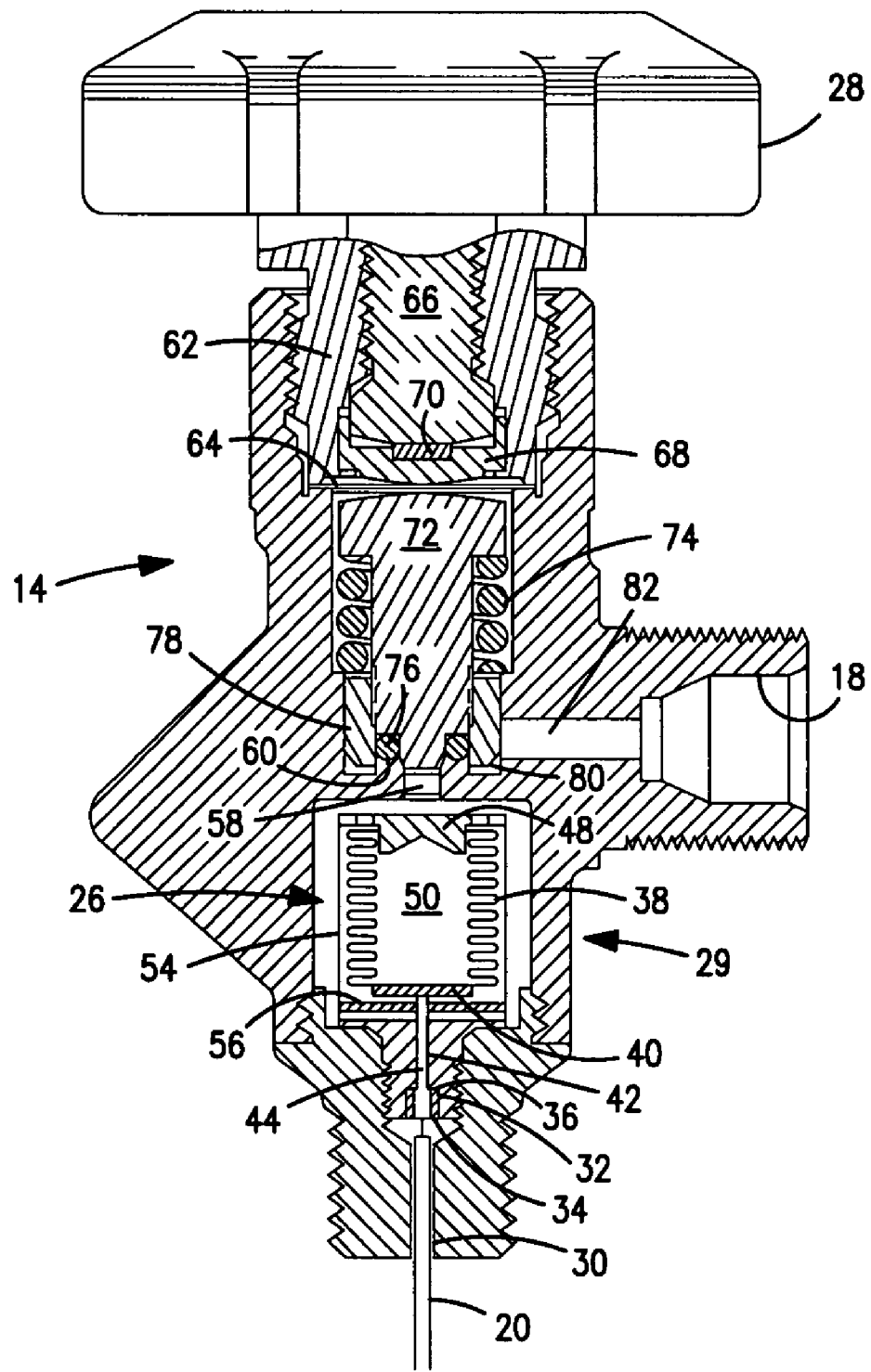
FIG. 2 depicts an enlarged schematic cross-sectional view of the valve head assembly having a vacuum actuated check valve disposed therein.

With reference to FIG. 2, the fluid flow path is illustrated vis-à-vis the inner components. In an exemplary embodiment, and for ease of explanation, the vacuum actuated check valve 26 is disposed in port body 29 of single port cylinder valve head 14. Following then the path of the boron trifluoride gas out of head valve 14, the gas first enters valve inlet 30 through internal flow restrictor tube 20. The port body of head valve 14 contains the vacuum actuated check valve 26. Entering gas first contacts valve element in the form of poppet 32. A spring 34 biases poppet valve 32 against a valve seat 36 to create a closed condition along the gas flow path. The top of poppet valve 32 may retain a resilient washer or other sealing element to maintain a positive seal across valve seat 36. Spring 34 normally presses poppet valve 32 against valve seat 36 until the bellows 38 expand to displace a contact plate 40. Contact plate 40 acts on a control pin 42 that pushes poppet 32 away from valve seat 36. Boron trifluoride gas may then flow through pin passage 44 around pin 42 and into a housing 54 that accommodates the bellows 38.

Bellows chamber 50 consists of a bellows guide 48 that defines an internal pressure chamber having an outer sleeve/housing 54 that surrounds the exterior of the bellows chamber; and a bottom guide plate 56. Sealing contact at the upper end of the bellows with bellows guide 48, and at the lower end of the bellows with contact plate 40, isolates the bellows from pressure within vacuum actuated check valve 26 and the gas flow path in general. The internal part of bellows chamber 50 (i.e., the pressure chamber) is typically sealed at atmospheric pressure such that a reduction in pressure in the housing surrounding bellows chamber 50 causes the gases in bellows chamber 50 to expand bellows and urge contact plate 40 downward against pin 42.

Bellows guide 48 retains outer sleeve 54 about its outer edge. Outer sleeve 54 positions with guide plate 56. Together, bellows guide 48, outer sleeve 54 and guide plate 56 protectively enclose bellows chamber 50. Pin 42 passes through a central hole in the guide plate 56 to maintain its alignment with contact plate 40.

Boron trifluoride gas that passes out of the housing encompassing bellows chamber 50 flows through a valve inlet port 58 and across a sealing surfaces 60. Threaded bushing 62 clamps a multi-layer metallic diaphragm 64 to port body 29 thereby forming a positive seal against fluid leaking past the valve stem 66. Handle 28 operating in conjunction with threaded valve stem 66, forces piston 68 via friction pad 70 onto diaphragm 64 to move the main valve plunger 72 down against the resisting force of spring 74. Downward movement of plunger 72 forces a elastomer sealing element 76, retained by nut 78, to create a seal at surfaces 60. Backing valve stem 66 away from diaphragm 64 allows spring 74 to force valve plunger 72 up, thereby separating the sealing surfaces 60 and permitting gas to flow through port 58. Once past sealing surfaces 60 boron trifluoride gas flows from a chamber 80 through conduit 82 and to the user port 18.

This check valve 26 can be set to reliably prevent opening of the poppet 32 until pressure within the bellow housing drops to a vacuum condition. This condition is usually equal to 760 torr or less. With this setting of the vacuum actuated check valve, turning handle 28 in a counter clockwise direction so as to retract valve plunger 70, would not result in a dispensation of boron trifluoride from the cylinder. Since the typical end-user's apparatus operates at pressure less than 100 torr, dispensing boron trifluoride at a vacuum, and particularly at pressures of 500 torr of less, has several distinct advantages. For instance there is a negative pressure at all of the boron trifluoride gas connections, so leaks can only leak into the end-user apparatus where they are quickly detected by the apparatus itself. Thus, one does not have to check joint by joint to verify that there are any leaks. In addition no external regulators are required for reducing the tank pressure to pressures acceptable to the end-user's mass flow controllers. More importantly an accidental opening of a pipe connection in the boron trifluoride system as described above is orders of magnitude less hazardous than accidental opening of a high-pressure delivery system connection.

It has been found, however, that for cylinders containing a fluid in gaseous state, such as boron trifluoride (i.e., at pressures exceeding 600 psig and up to 1500 psig) the thrust force of the bellows is insufficient to move the pin 42 and in turn poppet valve 32 off its seat.

Figure 3:
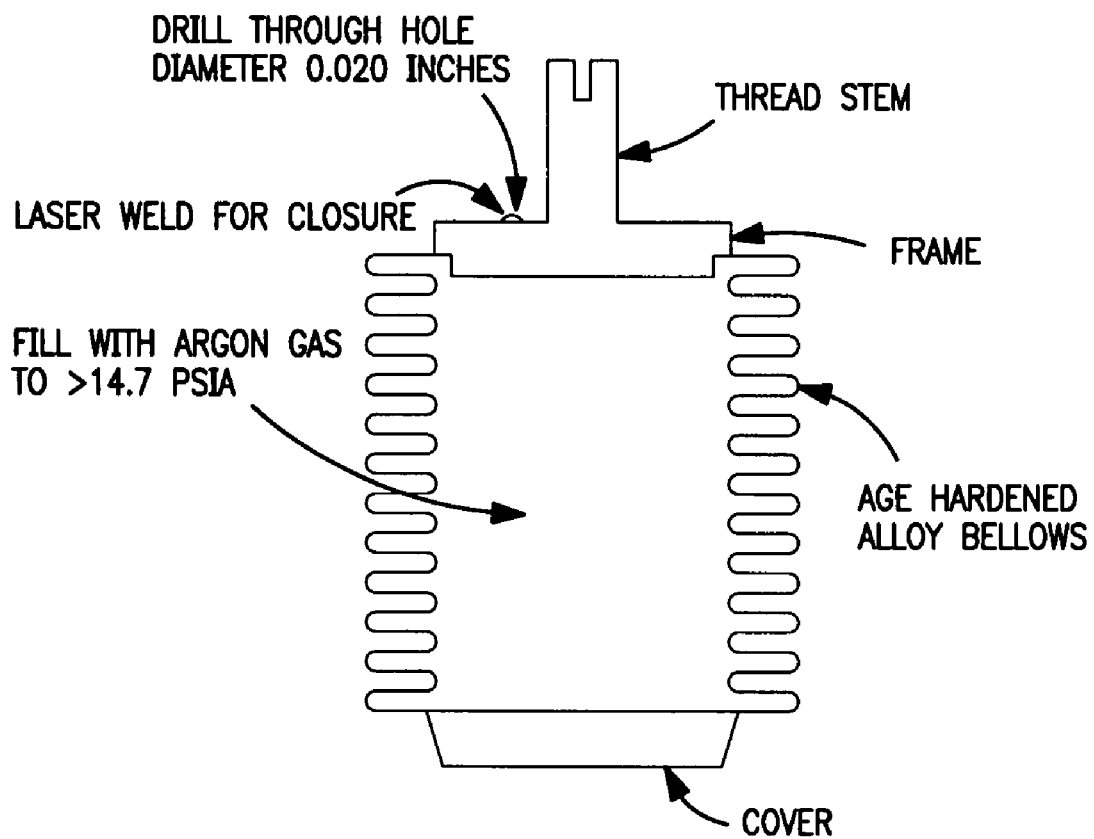
FIG. 3 is a schematic view of the bellows assembly/chamber in accordance with an exemplary embodiment of the present invention.

It has been discovered that charging or pressurizing the interior of the sealed bellows chamber 50 to a pressure greater than atmospheric pressure (i.e. greater than 14.7 psia) results in higher pressure differential when a vacuum is applied to the exterior of the bellows. As shown in FIG. 3, the bellows chamber is charged with an inert gas, such as argon, to a pressure ranging from about 14.7 psia to about 50 psia, preferably about 14.7 psia to 35 psia and most preferably to about 29.5 psia. In order to charge the bellows chamber 50 with gas at super-atmospheric pressure and attain the thrust force necessary to move the pin in a system where the stored gas pressure exceeds 600 psig, it has been found that age hardened bellows materials would withstand the sealed internal bellows pressure and in-turn provide adequate thrust force to unseat poppet 32. Preferably, the bellows materials are selected from the group consisting of age hardened steel alloys, age hardened nickel based alloys (e.g., inconel) and copper beryllium alloys. While the foregoing are preferred materials, it will be understood by those skilled in the art that other materials having similar physical properties can be employed.

In particular, the operation of the vacuum actuated check valve is based on a repeatable extension of the bellows as it senses sub-atmospheric pressures. The operation of the bellows over the length of its service life is critical (i.e. extension/contraction repeatability in response to a pressure condition). Bellows fabricated from cold worked materials such as austenitic stainless steels (utilized in the related art) have the potential to exhibit instability in terms of overall length change. Bellows length degradation or compression set is a characteristic of spring elements (i.e., bellows and helical springs, in which residual stresses are imparted during their forming process). The optimum class of materials for fabricating bellows elements with high resistance to compression set (or length degradation) and long term repeatability, are age or precipitation hardened alloys, such as the ones discussed above. The age hardened alloys are preferred candidate materials since bellows chambers formed from this class of materials exhibit superior corrosion resistance and mechanical properties for the desired thrust forces. An additional benefit conferred by manufacturing the bellows with age hardened materials is the elimination of a bellows conditioning procedure. Specifically, in the related art a bellows conditioning procedure was developed and implemented prior to assembly of the bellows chamber into the system. This labor intensive procedure is no longer required as a result of utilizing the age hardened materials of the present invention.

Based on the modifications to the bellows materials and the charging of the bellows chamber, high pressure cylinder 12 can be filled to a capacity up to three times higher than cylinders currently utilized for ion implantation, without changing the dimensions of the cylinder. For example, for boron trifluoride the current 2.27 liter cylinders with the bellows chamber of the present invention can be filled to a capacity of 1000 grams (at 1235 psig) versus 335 grams (at 600 psig) and 3180 grams versus 1065 grams for 6.33 liter cylinders currently employed.

Referring back to FIG. 1, a restricted flow passage 20 can be placed along the flow path, upstream of the vacuum actuated check valve 26 to restrict the flow of gas in the unlikely event that the check valve fails in an open position, or otherwise valve head 14 having the check valve therein is sheared. One such restrictor in the form of a capillary offers the most flexibility and reliability as a flow restrictor. Whether provided by single or multiple small diameter bores or tightly packed materials, suitable restrictors of this type will desirably limit the transport of gas phase fluids to very low rates.

For example, a single bore capillary can limit atmospheric boron trifluoride release to less than about 35 sccm of boron trifluoride at a cylinder pressure of 1200 psig and temperature of 68° F., while a seven bore capillary can limit the flow rate to about 245 sccm at similar conditions. The capillary tube provides the only exit from cylinder 12, and it can be in a winding formation and ordinarily has an internal diameter of less than 0.02 millimeters (0.001 inch).

Figure 4:
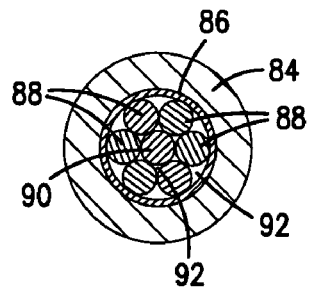
FIG. 4, depicts a schematic cross-sectional view of an internal flow restrictor in accordance with an exemplary embodiment.

A variety of suitable capillary structures may be created. As shown more clearly by the cross-sectional view in FIG. 4, a metal tube 84, typically constructed from stainless steel, protectively surrounds a glass tube 86. The inside of diameter tube 86 holds a hexagon arrangement of 6 solid glass rods 88 about a central glass rod 90 and wherein all of the rods have about the same diameter. The spaces 92 between the rods 88 and rod 90 and between the rods 88 and the inside of tube 86 provide flow areas of capillary size for metering gas through the internal flow restrictor 20. Shrinking glass tube over the glass rods 88 and 90 provides a rigid tube and rod assembly. Therefore, even if the internal rods break, retention of the pieces by glass tube 86 will maintain capillary flow through the internal diameter of glass tube 86. Metal tube 84 adds further rigidity and durability when optionally shrunk around glass rods 88 and 90 to provide a reinforced unit. With the optional reinforcement of metal tube 84, fracture of the glass rods or their surrounding glass tube would leave the function of the restricted flow path through the capillary structure substantially unchanged.

The present invention will further be illustrated below by referring to the following example and comparative example, which are, however, not to be construed as limiting the invention.

Comparative Example 1

Figure 5:
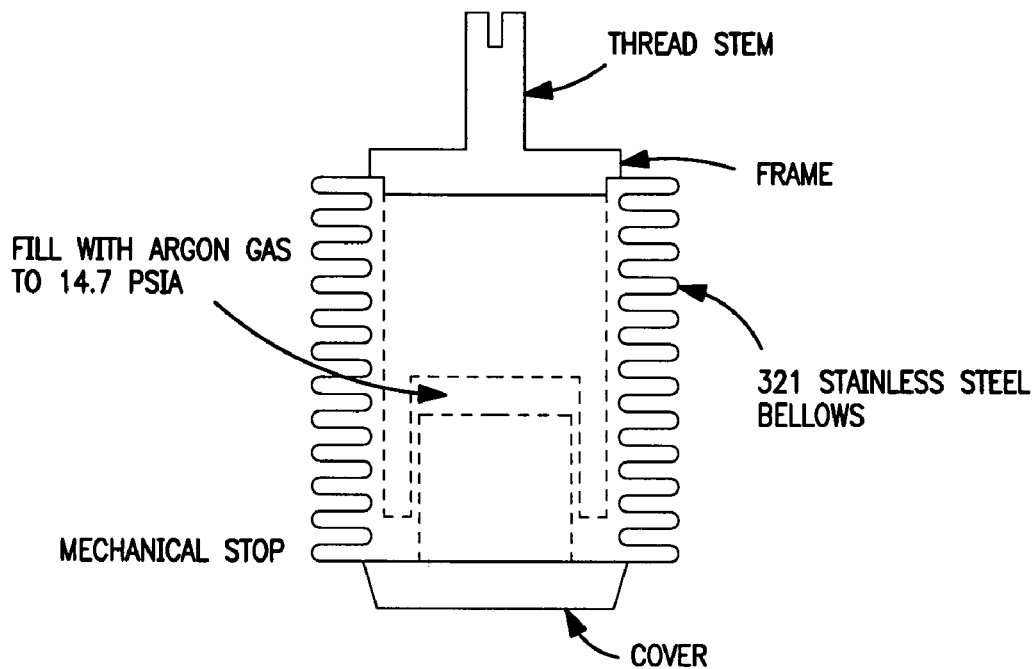
FIG. 5, is a schematic view of a prior art bellows assembly/chamber.

Measuring the thrust force of the bellows in a conventional vacuum actuated check valve was conducted. With reference to FIG. 5, the interior annulus of the sealed bellows chamber was filled to a pressure of 14.7 psia with argon gas. The bellows were constructed of a 321 stainless steel (i.e., an austenitic stainless steel). Assuming the bellows mean effective area (MEA) is 0.237 in$^2$, the downward force in pounds produced by an actuation pressure of 300 torr (5.8 psia) is the differential of the its internal pressure (14.7 psia) and the actuation pressure (5.8 psia) multiplied by the MEA (0.237 in$^2$). Hence, 2.11 lbf of downward force is exerted on the pin/poppet assembly opening the check valve for the flow of gases in the cylinder. Sufficient opening forces are produced with this bellows design to overcome the closing forces exerted on the pin/poppet by combination of the pre-compressed spring and the internal gas pressure which for $BF_3$ is up to 600 psig. However, at internal gas pressures of greater than 600 psig the conventional bellows assembly cannot produce sufficient downward thrust to open the valve. Hence, for $BF_3$ (and other gases) the cylinder capacity is limited to a cylinder maximum pressure of 600 psig.

Example 2

In the vacuum actuated check valve of the present invention, the bellows thrust force has been increased by modifying the bellows parameters so as to utilize conventional cylinder port openings, to in turn accommodate a substantial higher $BF_3$ capacity in the storage and delivery system. The bellows assembly configuration for the high capacity $BF_3$ design is shown in FIG. 3. The significant changes are the bellows material of construction and the annulus fill pressure. As previously mentioned the precipitation or age hardened alloys have the best combination of properties for manufacture and operation of bellows, bordon tubes, springs, etc. They acquire their elastic properties as a result of heat treatment in contradistinction to austenitic stainless steels. Increasing the fill pressure in the annulus to 29.5 psia, results in downward thrust force of 5.62 lbf at the same 300 torr vacuum actuation pressure. The bellows configuration in the present invention develops sufficient force to open the valve allowing cylinder fill capacities substantially higher than 600 psig.

Figure 6:
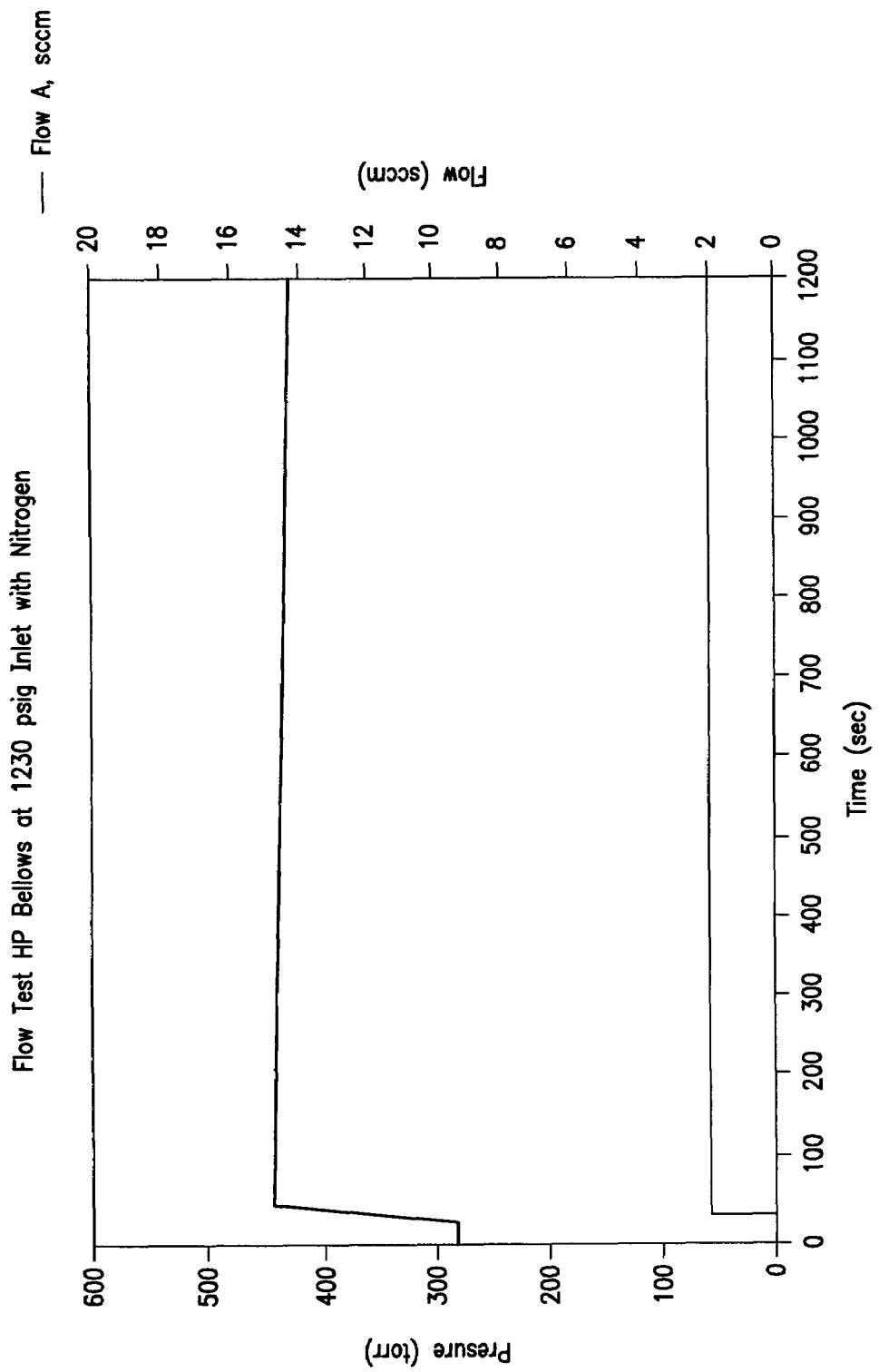
FIG. 6 illustrates test results for check valves incorporating the bellows chamber of the present invention where the system was pressurized with nitrogen at 1230 psig.

The vacuum actuated check valve of the present invention therein was installed in a gas storage and delivery system and a flow test was conducted. Nitrogen gas was provided into the system so that the inlet pressure onto the vacuum actuated check valve was 1230 psig. The flow test was conducted over a two and a half hour period of time. A pressure transducer connected downstream of the use-port measured sub-atmospheric actuation pressures as the MFC controlled the flow rates to 2 sccm. As shown in FIG. 6, the vacuum actuation pressure for the check valve with a cylinder fill pressure of 1230 psig was between 420 and 440 torr. Thus, this indicates the bellows function at an input pressure of 1230 psig and confirms the force summation model calculated above and shown to provide the proper thrust force in order to move the poppet off its seat and allow the gas to be removed from a high pressure high capacity storage vacuum delivery system.

While the invention has been described in detail with reference to specific embodiments thereof, it will become apparent to one skilled in the art that various changes and modifications can be made, and equivalents employed, without departing from the scope of the appended claims.

What is claimed is:

1. A system for controlling the discharge of pressurized fluids from the outlet of a pressurized tank containing hydridic or halidic compounds, the system comprising:
    a tank for holding a pressurized fluid in a gaseous or partially gaseous phase;
    a port body for communication with the outlet of the pressurized tank defining a fluid discharge path;
    a valve element fixed in or upstream of the port body and adapted to movement between a sealing position that blocks fluid flow through the fluid discharge path and an open position that permits fluid along the fluid path;
    a bellows chamber disposed within a housing downstream of the valve element, wherein the bellows chamber is charged and sealed to a pressure ranging from greater than about 14.7 psia to about 50 psia, having bellows made of a age hardened inconel material; and
    said bellows chamber communicates with a portion of the fluid discharge path downstream of the valve element to move the valve element to the open position when communication with the discharge path produces a vacuum condition within the housing.

2. The system of claim 1, wherein the valve element comprises a poppet valve and expansion of the bellows causes a pin to displace the poppet valve to an open position.

3. The system of claim 1, wherein the tank contains a gaseous fluid at a pressure ranging from about 600 psig to about 1500 psig at maximum capacity conditions.

4. The system of claim 1, where the bellows chamber is sealed with a pressure of about 25 psia.

5. The system of claim 1, wherein the tank further includes a restrictor along at least a portion of the flow path that limits the flow of the gas contained in the tank to less than 35 sccm at atmospheric conditions.

6. The system of claim 5, wherein the restrictor is at least one conduit.

7. The system of claim 6, wherein the at least one conduit is a capillary tube having an internal diameter that does not exceed 0.2 mm.

8. A cylinder and a valve assembly for containing pressurized fluid and controlling the discharge of pressurized fluids from the cylinder, the cylinder and the valve assembly comprising:
    a cylinder having a cylinder opening;
    a port body adapted for sealing engagement with the cylinder opening;
    a fluid inlet port defined by the port body and located within the cylinder;
    a fluid outlet port defined by the port body and located outside the cylinder;
    a fluid discharge path defined by the port body between the fluid inlet port and the fluid outlet port;
    a shut-off valve for controlling fluid flow along the fluid discharge path;
    a valve element biased into a sealing position that blocks fluid flow along the fluid discharge path;
    a vacuum actuated check valve containing a bellows chamber charged and sealed to a pressure ranging from greater than about 14.7 psia to about 50 psia, located downstream of the valve element along the fluid discharge path, having bellows made of age hardened inconel material; and
    the bellows chamber has one portion fixed with respect to the body of the vacuum actuated check valve and another portion operably linked to the valve element when relative pressure between the interior and exterior of the bellows expands the bellows and biases the valve element in an open position so as to permit fluid flow along the fluid discharge path.

9. The cylinder and the valve assembly of claim 8, wherein the vacuum actuated check valve is disposed in entirely or partially within the port body.

10. The cylinder and the valve assembly of claim 8, wherein the vacuum actuated check valve is disposed within the cylinder, upstream of the port body.

11. The cylinder and the valve assembly of claim 8, wherein the bellows are adapted to move the valve element to an open position in response to a vacuum condition.

12. The cylinder and the valve assembly of claim 8, wherein the vacuum actuated check valve comprises a poppet.

13. The cylinder and the valve assembly of claim 8, further comprising a restrictor along at least a portion of the flow path.

14. The cylinder and the valve assembly of claim 13, wherein the restrictor limits the flow of gas contained in the cylinder to less than 35 sccm at atmospheric conditions.

15. The cylinder and the valve assembly of claim 14, wherein the restrictor comprises at least one capillary tube having an inside diameter of less than 0.2 mm.

16. The cylinder and the valve assembly of claim 8, wherein the cylinder contains a gaseous fluid at a pressure ranging from about 600 psig to about 1500 psig.

17. The cylinder and the valve assembly of claim 8, where the bellows chamber is sealed with a pressure of about 25 psia.

18. The cylinder and the valve assembly of claim 8, where the bellows is an aged hardened inconel material.

19. A bellows assembly of a vacuum actuated check valve, comprising:
    a bellows chamber disposed within a vacuum actuated check valve housing, wherein the bellows chamber is charged and sealed to a pressure ranging from greater than 14.7 psia to 50 psia, and having bellows made of age hardened inconel material; and
    said bellows being responsive to a vacuum condition on the exterior of the bellows chamber to expand the bellows with thrust force of at least 4 lbf.

* * * * *